United States Patent [19]

Kovach

[11] Patent Number: 4,998,467

[45] Date of Patent: Mar. 12, 1991

[54] POTATO PEELING DEVICE

[76] Inventor: John R. Kovach, 2705 Normandy Dr., Youngstown, Ohio 44511

[21] Appl. No.: 440,860

[22] Filed: Nov. 24, 1989

[51] Int. Cl.[5] .................... A23N 7/00; A23N 7/02; A47J 17/18
[52] U.S. Cl. ............................................. 99/632; 99/623
[58] Field of Search .................... 99/484, 629–634, 99/623; 366/314, 601; 241/199.12, 278 R

[56] References Cited

U.S. PATENT DOCUMENTS

| 850,424 | 4/1907 | Franklin et al. | 99/632 |
| 1,923,806 | 8/1933 | Anstiss | 99/633 |
| 1,945,978 | 2/1934 | Palombo et al. | 99/632 |
| 1,966,501 | 7/1934 | Hoe | 99/633 |
| 1,979,384 | 11/1934 | Harbaugh | 99/632 |
| 2,794,472 | 6/1957 | Veenhuizen et al. | 99/632 |
| 3,266,540 | 8/1966 | Bradham | 99/633 |
| 3,762,308 | 10/1973 | Greene et al. | 99/632 |
| 3,848,524 | 11/1974 | Semrow | 99/631 |
| 4,442,764 | 4/1984 | Bos et al. | 99/629 |
| 4,768,429 | 9/1988 | Federighi | 241/199.12 |

FOREIGN PATENT DOCUMENTS

| 1141759 | 12/1962 | Fed. Rep. of Germany | 99/634 |
| 468845 | 2/1952 | Italy | 99/633 |
| 954661 | 4/1964 | United Kingdom | 99/634 |

Primary Examiner—Timothy F. Simone
Attorney, Agent, or Firm—Harpman & Harpman

[57] ABSTRACT

An electrically driven cycleable potato peeler having a motor driven reversible rotating disk within an enclosure. An abrasive element is exposed within a portion of the enclosure with a directional flange extending from the rotary disk for engagement with the potatoes positioned therein.

3 Claims, 1 Drawing Sheet

POTATO PEELING DEVICE

BACKGROUND OF THE INVENTION

1. Technical Field

This invention relates to motorized potato peelers that are used to remove the potato skins by contact with abrasive surfaces rather than manually peeling the potatoes with a knife or other sharp blade-like instrument.

2. Description of Prior Art

Prior Art devices of this type have relied on a variety of different configurations that spin or rotate potatoes within an enclosed spaced forcing the potatoes into contact with an abrasive surface repeatedly thereby removing the potato skins, examples of such devices are U.S. Pat. No. 3,762,308, U.S. Pat. No. 2,794,472, U.S. Pat. No. 1,945,978 and U.S. Pat. No. 850,424.

In U.S. Pat. No. 3,762,308 a potato peeler is disclosed utilizing a motor driven rotary disk having an abrasive surface and a deflector mounted within the container above the disk. The container is filled with water and potatoes during use.

U.S. Pat. No.2,794,472 is directed to a manually operated peeling machine having a water filled container with a rotatable disk within that is angularly inclined on a central pivot or rotation point. A curved auxiliary abrasive wall is secured to an inner vertical wall of the container. A manually operated crank extends from the container and is connected to the disk for rotation of the same.

In U.S. Pat. No. 1,945,978 a potato peeling machine is shown having a container with a water driven rotating cutting disk. A pair of oppositely disposed vertical cutting members are secured to their respective side walls for engagement with the potatoes as they are rotated by the water driven disk.

U.S. Pat. No. 850,424 discloses a peeling machine for vegetables having a generally convex shaped rotatable disk within a container. A hinge door and step arm assembly having an abrasive surface can be extended into the potato path for peeling same.

SUMMARY OF THE INVENTION

A self-contained motorized reversible potato peeler that uniformly peels a plurality of potatoes by directional impingement against an abrasive surface. The potato peeler of the invention uses a rotating disk having an upstanding product engagement element to drive the potatoes first in one direction and then momentarily in the opposite direction to reposition potatoes for uniformity peeling and enhanced effect and fast peeling action.

DESCRIPTION OF THE PREFERRED EMBODIMENT

Figure 1:
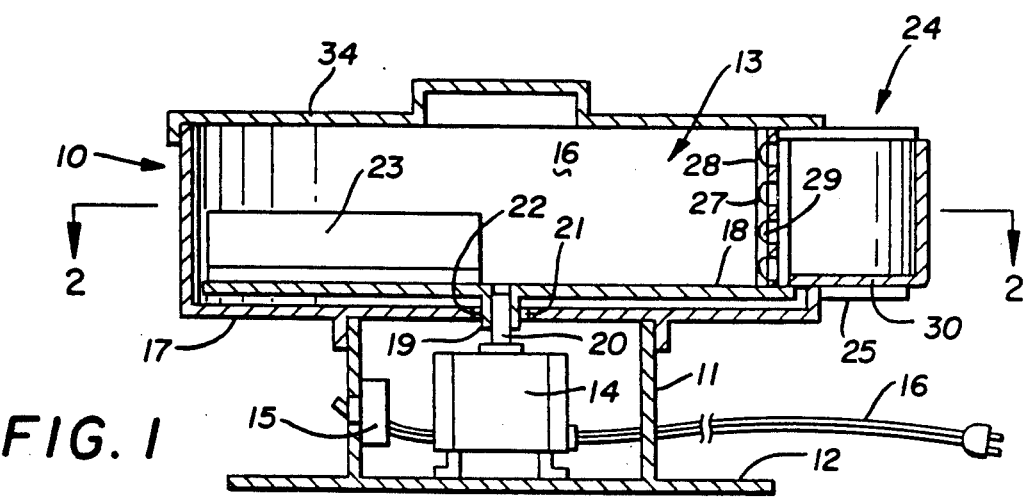
FIG. 1 is a cross-sectional view of the embodiment of the invention.
Figure 2:
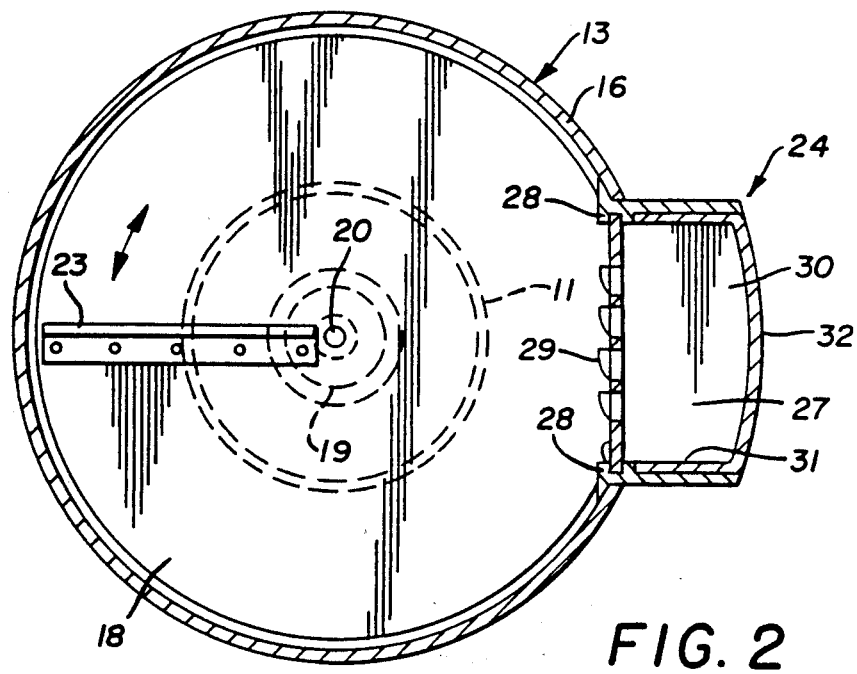
FIG. 2 is a section on lines 2—2 of FIG. 1.
Figure 3:
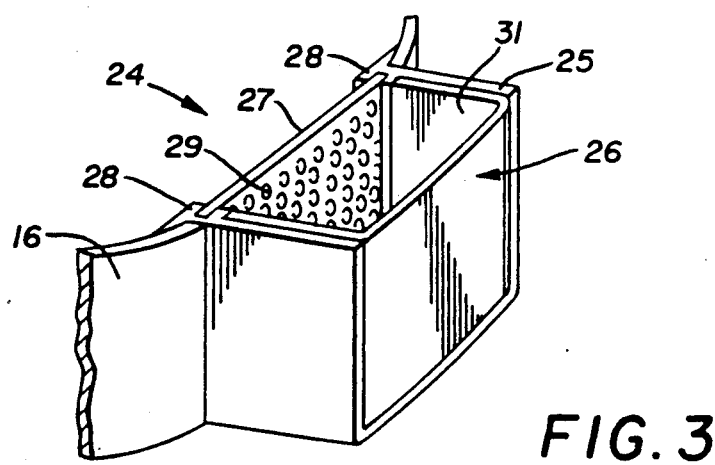
FIG. 3 is an enlarged perspective view of the peeling surface plate of the invention.

Referring to FIGS. 1,2, and 3 of the drawings a potato peeler 10 is disclosed comprising a base enclosure 11 having an annular support flange 12 extending therefrom and a container 13 removably supported thereon. The enclosure 11 has a motor 14 positioned within with a control and power switch 15 connected to a power source and to the motor by respective power cords 14. The container 13 has an annular vertical wall 16 extending from a horizontally disposed bottom 17 integral with said enclosure 11. A turntable 18 is positioned with the container 13 and has a centrally positioned journaled lug 19 extending therefrom in vertical alignment with an output shaft 20 of the motor 14 within the enclosure as hereinbefore described.

The horizontally disposed bottom 17 is apertured at 21 to accept a bearing fitting 22 through which the journaled lug 19 extends for locking engagement with the output shaft 20 of the motor 14 so that the container 13 is removable from enclosure 11.

Referring now to FIGS. 1 and 2 of the drawings a directional upstanding flange 23 is secured to and extends at right angles from said turntable 18 in radial alignment in oppositely disposed relation to the journaled lug 19. The flange 23 extends to a height equal to approximately one-half the height of said annular vertical wall 16 and is engageable with potatoes (not shown) positioned within the container 13 on the turntable 18 during use.

Referring now to FIGS. 1,2, and 3 of the drawings an abrasion assembly 24 can be seen extending from the vertical side wall 16 comprising a three wall support frame 25, a peel receptacle 26 and a straight abrasive plate 27. A pair of oppositely disposed vertically aligned plate guides 28 engage the respective end surfaces of the vertical wall 16 and the support frame 25. The abrasive plate 27 has a plurality of spaced non-aligned apertures and formed convex surfaces 29 as will be well known by those skilled in the art. The abrasion plate 27 is inserted vertically between the plate guides 28 defining a straight abrasive surface within the curvilinear surface of the side wall hereinbefore described.

The peel receptacle 26 has a bottom 30, oppositely disposed side walls 31 and an end wall 32 with the abrasive plate 26 acting as an oppositely disposed end wall. The peel receptacle 26 is received within the three walled support frame 25 and can be removed as required.

In use a number of potatoes are placed within the container 13 and are supported by the turntable 18. A lid 34 is positioned over the top of the container as seen in FIG. 1 of the drawings. The motor is activated causing rotation of the turntable 18 initially in one direction driving the potatoes within by the flange 23 around the interior of the container 13 against the side wall 16 and the abrasive plate 27. The rotational direction of the turntable 18 is momentarily reversed in an alternating sequence by the control switch 15 by reversing the power input to the motor 14 as is well known and understood by those skilled in the art. Upon reversal of the turntable 18, the potatoes are driven in reverse rotation repositioning them so that unpeeled surfaces are exposed for peeling when the turntable 18 resumes its original rotation driving the repositioned potatoes against the abrasive plate 27, thus enhancing and increasing the peeling effect and substantially reducing the time and rotational speed required to peel a plurality of potatoes. After the peeling is complete the peel a receptacle 26 is slideably removed and emptied as hereinbefore described.

The container 13 can be easily removed from the enclosure 11 for cleaning and storage apart from the enclosure having the motor and controlling switch therein. It will occur to those skilled in the art that the container 13 could be modified to engage other existing power driven small appliances such as a blender base (not shown).

It will be apparent to those skilled in the art that various modifications and changes may be made therein without departing from the spirit of the invention, therefore I claim:

1. A motorized potato peeler comprises; a base enclosure, a motor and shaft within said enclosure, a removable container supported on said base enclosure, said container having a bottom, an annular side wall and a removable closure, a rotatable turntable in spaced relation to the bottom of said container, a fixed upstanding flange extending radially from said turntable, an abrasive plate positioned within a portion of said annular wall, means for interconnecting said motor and said shaft to said turntable, a peel receptacle secured to said annular side wall, means for cycleably reversing said directional rotation of said turntable and a source of power for said motor.

2. The potato peeler of claim 1 wherein said means for connecting said turntable and said motor and shaft comprises a journaled lug extending from said turntable.

3. The potato peeler of claim 1 wherein said means for cycling said motor and said turntable comprises a control and power switch interconnected to said power source.

* * * * *